M. JOHNSON.
POTATOE DIGGER AND CULTIVATOR.
No. 93,307.  Patented Aug. 3, 1869.
Fig. 1.
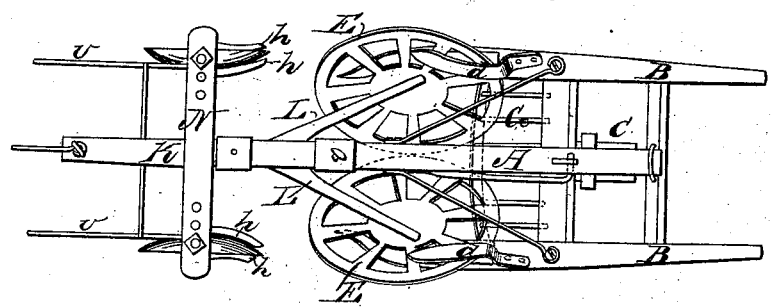
Fig. 2.
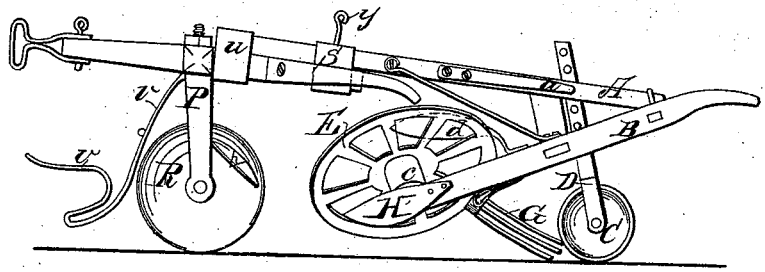
Fig. 3.  Fig. 4.  Fig. 5.  Fig. 6.
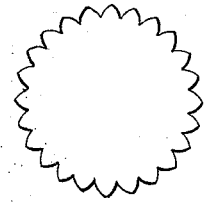 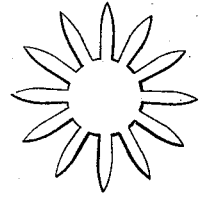 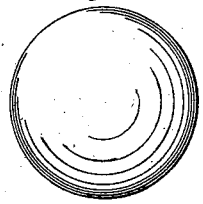 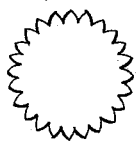
Fig. 7.
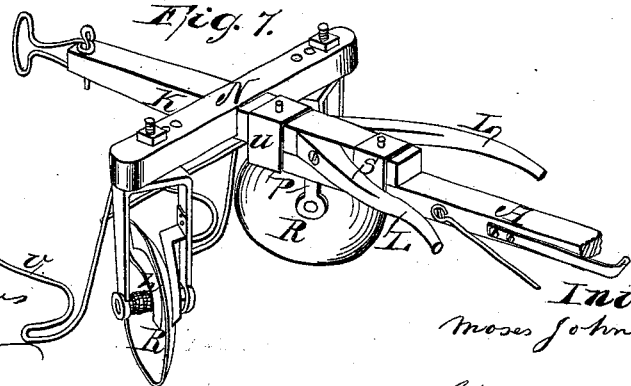
Witnesses:
James P. Grews
L. D. Kane
Inventor:
Moses Johnson
Chipman Hosmer & Co
attys.

United States Patent Office.

MOSES JOHNSON, OF THREE RIVERS, MICHIGAN.

*Letters Patent No. 93,307, dated August 3, 1869.*

---

IMPROVEMENT IN POTATO-DIGGER AND CULTIVATOR COMBINED.

---

The Schedule referred to in these Letters Patent and making part of the same.

---

*To all whom it may concern:*

Be it known, that I, MOSES JOHNSON, of Three Rivers, in the county of St. Joseph, and State of Michigan, have invented a new and valuable Improvement in Potato-Diggers and Cultivators Combined; and I do hereby declare that the following is a full, clear, and exact description of the construction and operation of the same, reference being had to the annexed drawings, making a part of this specification, and to the letters and figures of reference marked thereon.

Figure 1, of the drawings, is a top plan view of my invention.

Figure 2 is a side view of the same.

Figures 3, 4, 5, and 6, are details.

Figure 7 represents the cultivator-portion of my device, with the beam A attached, and in the proper position for actual work in digging potatoes; while the figures 1 and 2 represent said beam in the proper position for transportation to or from the field.

My invention relates to potato-diggers; and

It consists, mainly, in the construction and novel arrangement of devices intended for use in removing potatoes from their hills, and freeing them from dirt, and also, in connecting with a potato-digger, a novel form of cultivator, intended to serve as efficient means for cultivating the soil.

The letter A, of the drawings, represents the rear or main beam of my potato-digger, and letters B, the handles attached thereto.

The letter C represents a roller arranged, in the usual manner, with proper bearings at the foot of the plate or bar D, which said bar passes through a staple affixed to a cross-bar between the handles, and also through the beam A, as shown.

This bar D is perforated, as shown on fig. 2, and is made adjustable in the plow-beam by means of said perforations, and the spring and pin *a*, operating in the usual manner for that purpose.

The letters E represents disks cut out, as shown, and rotating upon journals or pivots attached to the lower ends of the handles at the points *c*. These disks are arranged upon their pivots in such manner that they assume positions diagonal with the beam A. They are respectively made concave in form, and their convex sides are turned upward.

The letters *d* represent scrapers attached to the handles, as shown, and projecting over the disks E. These scrapers serve to keep the disks free from clay, roots, or other obstructions.

The letter G represents an apron, formed in the shape of a bent rake-head, and hinged to the lower side of handles B, as shown.

The letters H represent plows of the form shown on fig. 2, attached respectively to the lower ends of the handles B.

The above-described devices are intended for use in digging potatoes, or in cultivating the ground, and for either purpose are found valuable. I sometimes, however, prefer to attach to them the devices following, namely:

I construct a beam, represented by letter K, and attach thereto handles L, and cross-bar N, as shown.

To the cross-bar N, I attach staples P, in which I arrange the concave disks R, in such manner that their concave sides shall be turned outward, and they be allowed to rotate on suitable bearings.

I also arrange scrapers, *h*, both on the concave and convex sides of these disks. I also make the position of these disks adjustable, by means of apertures through the cross-bar N, through which apertures I pass the heads of staples P, and make said staples removable from one aperture to another by means of the threads and nuts that hold them to the cross-bar.

The letters *v* represent guards or scrapers arranged in front of the disks R, as shown. They consist of strong wires or small steel bars bent into the shape shown. They are sufficiently strong to serve as means for pulling up and removing potato-tops, weeds, and ordinary obstructions, but still are not too rigid to serve as springs.

The details, Nos. 3, 4, 5, and 6, show different forms of disks or wheels which I sometimes use in the place and stead of the disks R. The number of these forms may be increased to a great extent, and I make the substitution whenever the nature of the soil and its covering requires it.

The method usually adopted for attaching the beam K to the beam A is shown on figs. 1 and 2. It consists, mainly, of the rings *u* and *s*, and the pin *y*, operating as shown.

The beam K, and its attachments, may be used as a cultivator without being connected with the beam A; or the beam A, and its attachments, may be used as a potato-digger or a cultivator, or both, without any connection with beam K.

What I claim as my invention, and desire to secure by Letters Patent, is—

1. The disks E, when constructed, applied, and operating as described, for the purposes specified.

2. In combination with the disks E, the scrapers *d*, apron G, plows H, and roller C, constructed and arranged substantially as and for the purposes described.

3. In combination with the foregoing devices, the attachable beam K, cross-bar N, disks R, scrapers *h*, and springs *v*, constructed and arranged substantially as specified.

In testimony that I claim the above, I have hereunto subscribed my name, in the presence of two witnesses.

MOSES JOHNSON

Witnesses:
JNO. S. MOWREY,
J. SPRAGUE PATTEN.